UNITED STATES PATENT OFFICE.

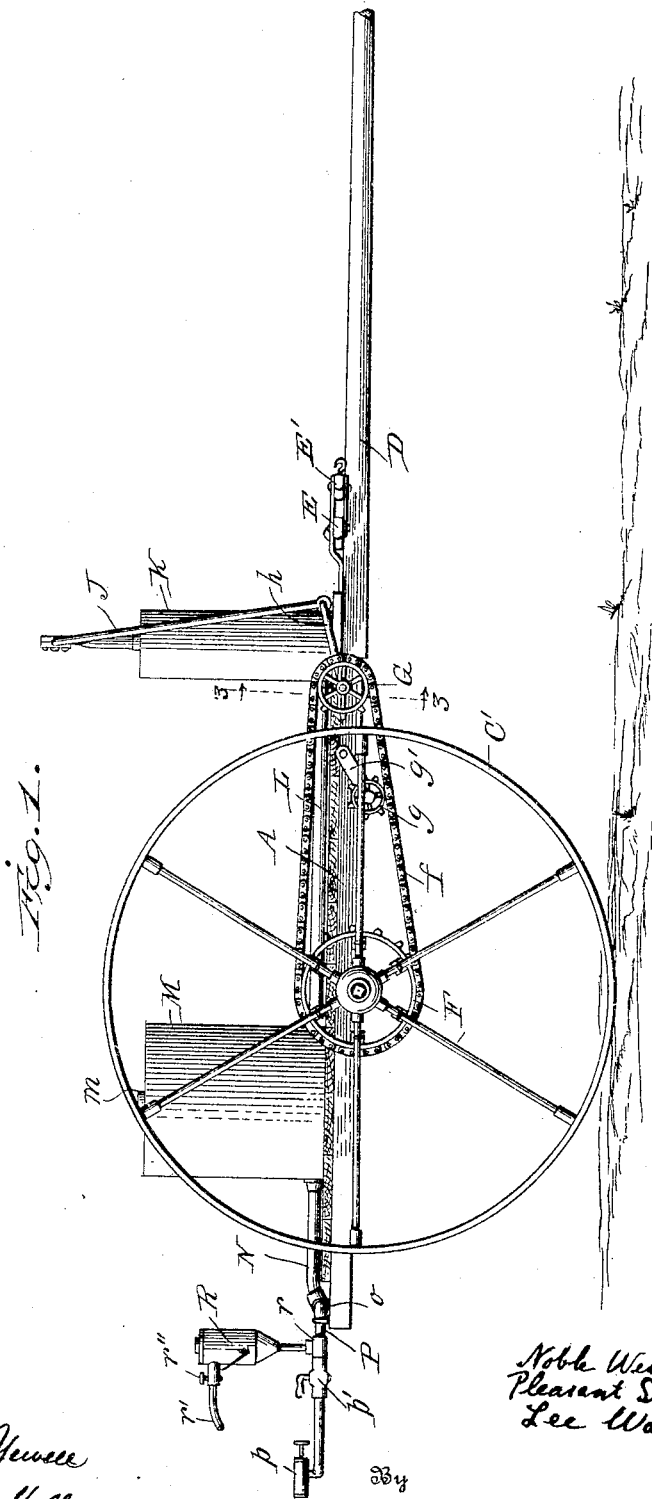

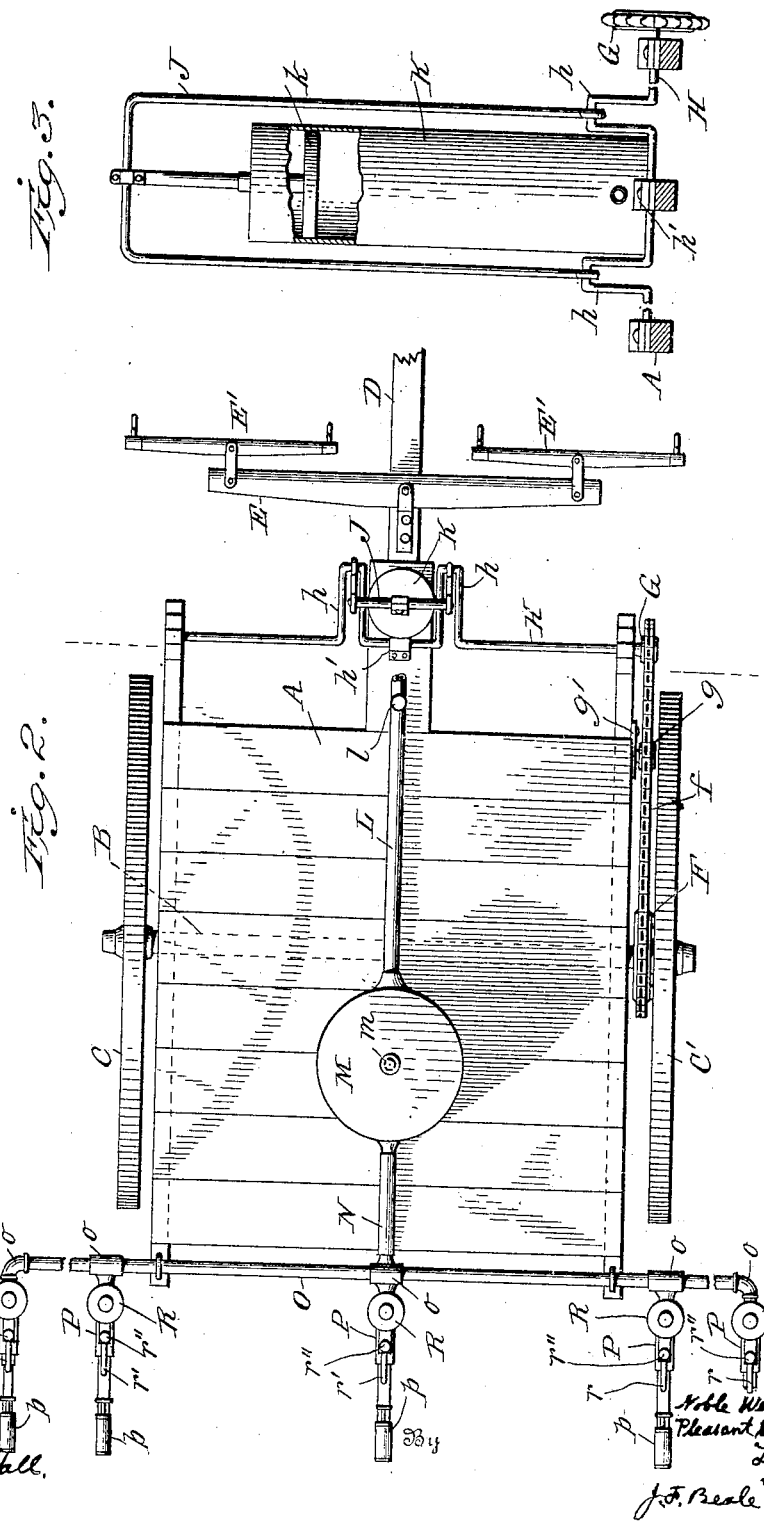

NOBLE WESLEY WARD, PLEASANT SIMEON WARD, AND LEE WARD, OF YANCEY, TEXAS.

POISON-DISTRIBUTER FOR PLANTS.

No. 805,689.             Specification of Letters Patent.            Patented Nov. 28, 1905.

Application filed February 28, 1905. Serial No. 247,829.

*To all whom it may concern:*

Be it known that we, NOBLE WESLEY WARD, PLEASANT SIMEON WARD, and LEE WARD, citizens of the United States, residing at Yancey, in the county of Medina and State of Texas, have invented new and useful Improvements in Poison-Distributers for Plants, of which the following is a specification.

Our invention relates to poison-distributers and machines for distributing poison on growing plants to destroy insects and vermin thereon.

It is our object to provide a machine adapted to distribute poison either in liquid form by spraying the poison over the plants or to dust a poison in powder form thereon.

Our poison-distributer in the present instance is designed to be drawn by horses. It is supported on an axle mounted upon two carrying-wheels; and the invention chiefly consists in arranging an air-pump actuated by mechanism driven by one of the carrying-wheels to compress air in a reservoir, the compressed air being utilized to expel the poison either in liquid or powder form through multiple discharge-pipes.

Our invention further consists in arranging multiple powder reservoirs or canisters adjacent to the liquid-discharge pipes and providing the same with independent powder-discharge pipes.

Our invention further consists in the parts and combination of parts, as hereinafter described.

In the accompanying drawings our invention is shown as applied more particularly to distributing poison upon growing cotton, embracing as many as five rows of plants at a time; but it is evident our invention may be employed as a poison-distributer in a variety of instances.

Figure 1 is a side elevation of our poison-distributing machine. Fig. 2 is a plan view of the same. Fig. 3 is a vertical cross-section taken on the line 3 3 of Fig. 1.

Referring more particularly to the drawings, A denotes the body or platform of the machine, supported by an axle B, which is mounted on carrying-wheels C C'.

D denotes a tongue provided with suitable doubletree and whiffletrees E E' E'.

F denotes a sprocket-wheel rigidly secured to the hub of the wheel C'.

*f* denotes a sprocket-chain connecting the sprocket F with a smaller sprocket-wheel G, mounted on one end of a double crank-shaft H.

*g* denotes an idler sprocket-wheel, meshing with chain *f* and journaled to an arm *g'*, which is secured to the platform.

The crank-shaft is formed with cranks *h h*, and between said cranks the shaft bears in a journal-box *h'*, secured to the platform.

J denotes a yoke the depending arms of which are journaled to the cranks *h h*.

K denotes a pump-cylinder mounted at the forward end of the platform, having a plunger *k* journaled to the head of the yoke.

L denotes a pipe provided with a suitable check-valve *l*, connecting the air-pump with the reservoir M. This reservoir is mounted on the platform immediately in rear of the axle and is provided with an opening *m* in the top for charging the same with liquid when it is desired to use a liquid therein, as hereinafter mentioned.

N denotes a pipe leading from the reservoir to a horizontal branch pipe O, supported upon the rear portion of the platform and extending from side to side thereof and projecting at each side, as shown in Fig. 2. The pipe O is connected by means of suitable unions *o* with five branch pipes P, provided with suitable spray-nozzles *p*.

*p'* denotes valves for regulating the quantity of liquid to be sprayed and also for closing the pipes P when it is desired to utilize the compressed air for dusting a powder over the plants.

R denotes reservoirs or canisters for holding poison in powder form. They are mounted on the pipes P by pipe-unions *r* and provided with outlet-pipes *r'*, having valves *r''* for regulating the supply of powder.

In operation the carrying-wheel C', through the sprocket-wheels F and G and chain *f*, actuates the double crank-shaft H to operate the air-pump. Air is thus forced through the check-valve into the reservoir M, where it is compressed sufficiently to force it through the pipes N and O and branch pipes P, and thence directly through the spray-nozzles, or, if powder is to be used and the valves *p'* are turned off, to force the powder from the canisters R through their outlet-pipes *r'*. When a poisoned liquid is used, it is placed in the reservoir M through the opening *m* and is forced out by air-pressure through the spray-nozzles.

Instead of placing a poisoned liquid in reservoir M poison in powder form or kerosene-oil may be fed to the liquid by gravity from canisters R as it passes through pipes P.

It will be seen that we dispense with mechanical means arranged inside the reservoirs or canisters R to agitate the powder before expelling it. By our arrangement of leading the compressed air in at the bottom and discharging it at the top of the canisters we effect the agitation by forcing the air upward through the body of powder in the canisters, the agitation and expulsion of the powder being simultaneous.

Having thus shown and described our invention, what we claim, and desire to secure by Letters Patent, is—

A machine mounted on carrying-wheels for distributing poison in liquid or powder form on a series of rows of plants, consisting of a compression-pump having its piston-rod connected to a double crank-shaft and yoke operated by one of the carrying-wheels, an air and liquid reservoir connected to said pump and centrally located with reference to a horizontal supply-pipe extending crosswise from side to side of the machine provided with a series of independent branch pipes having spray-nozzles said supply-pipe and branch pipe serving in common to convey either air or liquid and a series of powder-receivers connected at their lower ends to said branch pipes and having outlet-pipes at their upper ends.

In testimony whereof we affix our signatures in presence of two subscribing witnesses.

NOBLE WESLEY WARD.
PLES. SIMEON WARD.
LEE WARD.

Witnesses:
L. ESSARY,
THOS. COOPWOOD.